(12) United States Patent
Logan et al.

(10) Patent No.: US 7,247,398 B2
(45) Date of Patent: Jul. 24, 2007

(54) SYSTEM STACK CONTINGENCY AND EFFICIENCY SWITCHING

(75) Inventors: Victor W Logan, Naples, NY (US); James W Dandalides, Webster, NY (US)

(73) Assignee: General Motors Corporation, Detroit, MI (US)

( * ) Notice: Subject to any disclaimer, the term of this patent is extended or adjusted under 35 U.S.C. 154(b) by 302 days.

(21) Appl. No.: 10/413,272

(22) Filed: Apr. 14, 2003

(65) Prior Publication Data

US 2004/0202901 A1 Oct. 14, 2004

(51) Int. Cl.
*H01M 8/00* (2006.01)
*H01M 8/04* (2006.01)
*H01M 2/00* (2006.01)

(52) U.S. Cl. .............................. 429/13; 429/22; 429/34
(58) Field of Classification Search .................. 429/13, 429/22, 34
See application file for complete search history.

(56) References Cited

U.S. PATENT DOCUMENTS 5,663,113 A 9/1997 Midorikawa et al.
6,096,449 A * 8/2000 Fuglevand et al. ........... 429/13
2002/0031692 A1* 3/2002 Fuglevand et al. ........... 429/22

FOREIGN PATENT DOCUMENTS

DE 100 10 985 A1 9/2001

* cited by examiner

*Primary Examiner*—Dah-Wei Yuan
(74) *Attorney, Agent, or Firm*—Harness, Dickey & Pierce, P.L.C.

(57) ABSTRACT

A switching system and control method therefor are provided and implemented with a fuel cell stack system. The switching system enables fuel cell stacks to be connected in series for providing power to a power user while removing the particular disadvantages of a series circuit. In the event of a stack fault, the faulty stack may be bypassed, whereby the remaining stacks provide power to the power user at reduced capacity. The stack is continuously monitored and is reintroduced to the series circuit if the fault clears. If the fault reoccurs a predetermined number of times after the stack has been reintroduced, a "reduced capacity" mode is initiated. Additionally, in the event of a reduced or an increased current demand, stacks are selectively switched in and out of the series connection, for limiting the overall operation voltage range of the fuel cell stack system.

18 Claims, 7 Drawing Sheets

SYSTEM STACK CONTINGENCY AND EFFICIENCY SWITCHING

FIELD OF THE INVENTION

The present invention relates to fuel cell systems and more particularly to contingency and efficiency operation of a fuel cell system.

BACKGROUND OF THE INVENTION

Fuel cells have been used as a power source in many applications. For example, fuel cells have been proposed for use in electrical vehicular power plants to replace internal combustion engines. In proton exchange membrane (PEM) type fuel cells, hydrogen is supplied to the anode of the fuel cell and oxygen is supplied as the oxidant to the cathode. PEM fuel cells include a membrane electrode assembly (MEA) comprising a thin, proton transmissive, non-electrically conductive, solid polymer electrolyte membrane having the anode catalyst on one face and the cathode catalyst on the opposite face. The MEA is sandwiched between a pair of non-porous, electrically conductive elements or plates which (1) serve as current collectors for the anode and cathode, and (2) contain appropriate channels and/or openings formed therein for distributing the fuel cell's gaseous reactants over the surfaces of the respective anode and cathode catalysts.

The term "fuel cell" is typically used to refer to either a single cell or a plurality of cells (stack) depending on the context. A plurality of individual cells are typically bundled together to form a fuel cell stack and are commonly arranged in electrical series. Each cell within the stack includes the membrane electrode assembly (MEA) described earlier, and each such MEA provides its increment of voltage. A group of adjacent cells within the stack is referred to as a cluster. By way of example, some typical arrangements for multiple cells in a stack are shown and described in U.S. Pat. No. 5,663,113.

In PEM fuel cells, hydrogen ($H_2$) is the anode reactant (i.e., fuel) and oxygen is the cathode reactant (i.e., oxidant). The oxygen can be either a pure form ($O_2$) or air (a mixture of $O_2$ and $N_2$). The solid polymer electrolytes are typically made from ion exchange resins such as perfluoronated sulfonic acid. The anode/cathode typically comprises finely divided catalytic particles, which are often supported on carbon particles, and mixed with a proton conductive resin. The catalytic particles are typically costly precious metal particles. As such these MEAs are relatively expensive to manufacture and require certain conditions, including proper water management and humidification and control of catalyst fouling constituents such as carbon monoxide (CO), for effective operation.

The electrically conductive plates sandwiching the MEAs may contain an array of grooves in the faces thereof that define a reactant flow field for distributing the fuel cell's gaseous reactants (i.e., hydrogen and oxygen in the form of air) over the surfaces of the respective cathode and anode. These reactant flow fields generally include a plurality of lands that define a plurality of flow channels therebetween through which the gaseous reactants flow from a supply header at one end of the flow channels to an exhaust header at the opposite end of the flow channels.

Individual fuel cell stacks are connected together in a fuel cell system, as an electrical circuit for collectively supplying energy to a device, such as an electric motor. The stacks may be either connected as typical parallel or series circuits. A disadvantage of connecting the stacks in parallel is that a DC-DC converter is typically required for supplying the proper current to the device. Implementation of such a converter increases the weight, complexity and cost of the fuel cell system and is therefore undesirable. A series connection does not typically require the implementation of a DC-DC converter, however, it does have certain disadvantages. In particular, if one stack in the series is faulty then the fuel cell system is inoperable.

When the vehicle is operating at full power, maximum current is drawn from the fuel cell system resulting in a minimum total voltage thereacross. At idle, a minimum current is drawn from the fuel cell system resulting in a maximum total voltage thereacross.

The above operating considerations pose certain challenges when it is desired to integrate the stack into a system having several electrical components requiring power.

SUMMARY OF THE INVENTION

The present invention provides a fuel cell system having a plurality of fuel cell stacks connected in a series circuit. The fuel cell system includes a controller, an operation monitor in electrical communication with the controller and associated with each of the fuel cell stacks for monitoring an operational characteristic of the fuel cell stacks. A switching circuit is associated with each of the fuel cell stacks, and is in electrical communication with the controller for selectively bypassing a particular fuel cell stack from the circuit in response to signals from the controller.

The present invention further provides a method of operating a fuel cell stack system comprising a plurality of fuel cell stacks in series connection. The method includes the steps of monitoring each of the plurality of fuel cell stacks for a particular condition, bypassing at least one fuel cell stack of the plurality of fuel cell stacks if the condition is detected, and reconnecting the at least one fuel cell stack if the condition alleviates.

In accordance with one aspect of the method, the condition is a fault condition. Additionally, the method includes the steps of counting a number of times a particular fuel cell stack recurrently achieves the fault condition, and initializing a reduced capacity mode if the number of times is equal to a predetermined value.

In accordance with another aspect of the method, the condition is one of a reduced current demand or an increased current demand. In the case of a reduced current demand, the method includes the steps of determining a number of fuel cell stacks to bypass, as a function of the reduced current demand, and determining one of a particular fuel cell stack and particular fuel cell stacks to bypass. Further, the method includes the step of determining an average operating time for the plurality of fuel cell stacks, wherein the step of determining a particular fuel cell stack and particular fuel cell stacks to bypass is a function of the average operating time. In the case of increased current demand, the method includes the steps of determining a number of fuel cell stacks to reconnect, as a function of the increased current demand, and determining one of a particular fuel cell stack and particular fuel cell stacks to reconnect. The method further includes the step of determining an average operating time for the plurality of fuel cell stacks, wherein the step of determining a particular fuel cell stack and particular fuel cell stacks to reconnect is a function of the average operating time.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

The invention is applicable to fuel cell systems having a plurality of stacks and provides operational flexibility for such systems, particularly when load varies significantly or where failure of a stack affects operability of auxiliary systems.

The invention provides interconnection and operation of a plurality of stacks that permits continuation of power supply in the event one or more stacks becomes non-operable. In addition, such interconnection and operation provides regulation of voltage for compatibility with auxiliary and fuel cell system electrical components such as inverters, buffer devices (e.g. capacitors and batteries), and DC-DC converters.

More specifically, the invention provides an apparatus and method for selective by-pass of a stack or stacks to limit the operational voltage of the system. In another aspect, the invention provides a method for monitoring a plurality of stacks interconnected in a series arrangement. The monitoring method further includes monitoring the plurality of stacks to detect a fault, and selectively removing an identified faulty stack from the series stack arrangement. Preferably, the monitoring system continuously monitors the stacks and reconnects a faulty stack once the fault has cleared. The monitoring method further detects a reduced current draw requirement from the fuel cell system, and selectively removes a stack or stacks therefrom to reduce the maximum total voltage across the stack. For ease of discussion, the stack arrangement is described hereinbelow as a series arrangement or as a series circuit.

Figure 1:
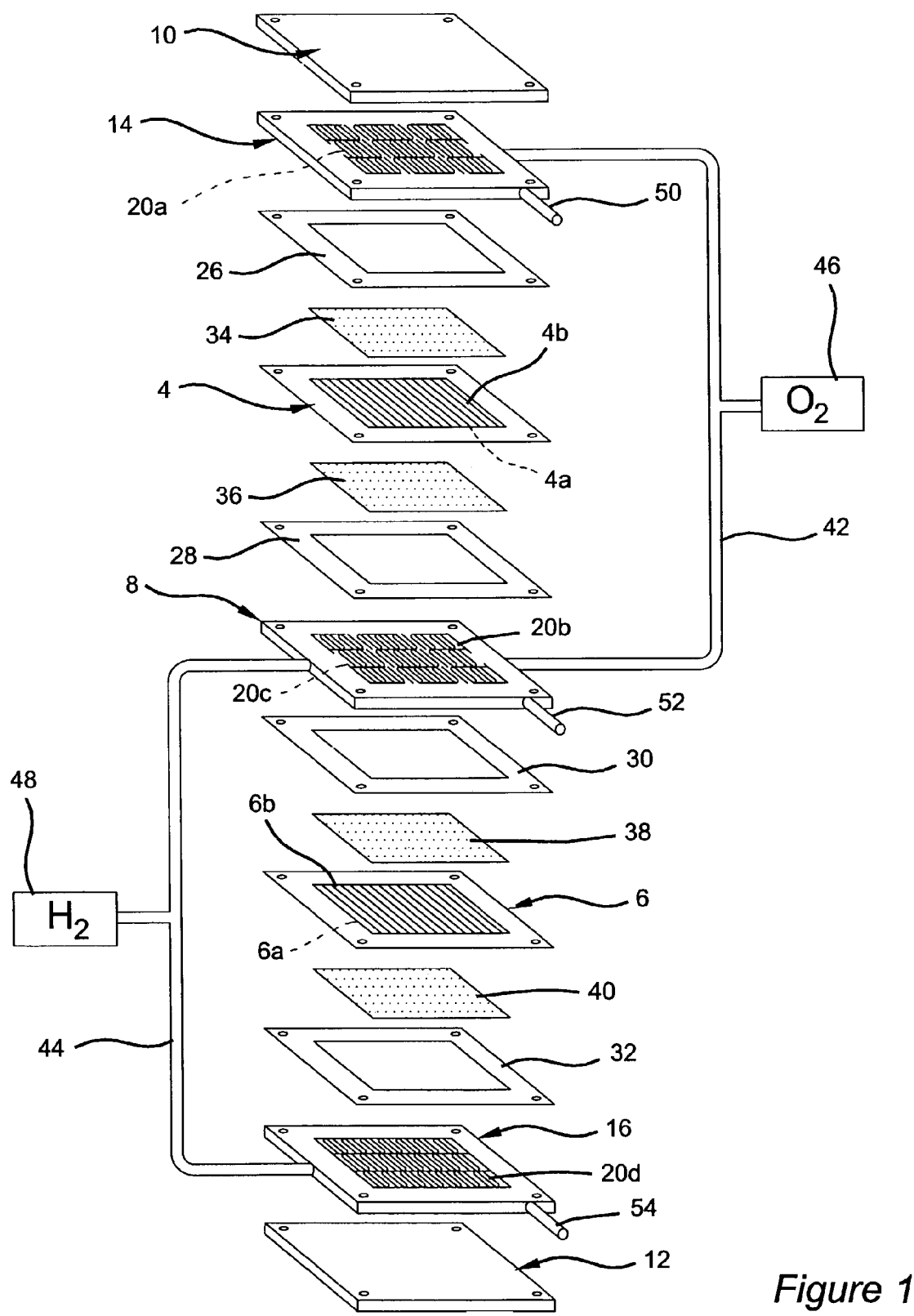
FIG. 1 is an exploded view of a typical fuel cell system including a plurality of fuel cells.

Before further describing the invention, it is useful to understand an exemplary fuel cell system within which the invention operates. Specifically, FIG. 1 schematically depicts a PEM fuel cell stack having a pair of membrane-electrode assemblies (MEAs) 4 and 6 separated from each other by a non-porous, electrically-conductive, liquid-cooled bipolar plate assembly 8. Each MEA 4 and 6 has a corresponding cathode face 4a and 6a and an anode face 4b and 6b. MEAs 4, 6 and bipolar plate assembly 8 are stacked together between non-porous, electrically-conductive, liquid-cooled monopolar end plate assembly 14 and 16. Steel clamping plates 10 and 12 are provided for enclosing the exemplary fuel cell stack. Connectors (not shown) are attached to clamping plates 10 and 12 to provide positive and negative terminals for the fuel cell stack. Bipolar plate assembly 8 and end plate assemblies 14 and 16 include corresponding flow fields 20a, 20b, 20c and 20d, each having a plurality of flow channels formed in the faces thereof for distributing fuel and oxidant gases (i.e., $H_2$ and $O_2$) to the reactive faces of MEAs 4 and 6. Nonconductive gaskets or seals 26, 28, 30, and 32 provide a seal and electrical insulation between the several plates of the fuel cell stack.

With continued reference to FIG. 1, porous, gas permeable, electrically conductive sheets 34, 36, 38 and 40 are shown to be pressed up against the electrode faces of MEAs 4 and 6 and serve as primary current collectors for the electrodes. Primary current collectors 34, 36, 38 and 40 also provide mechanical supports for MEAs 4 and 6, especially at locations where the MEAs are otherwise unsupported in the flow fields. Suitable primary current collectors include carbon/graphite paper/cloth, fine mesh noble metal screens, open cell noble metal foams, and the like which conduct current from the electrodes while allowing gas to pass therethrough.

End plates 14 and 16 press up against primary current collector 34 on cathode face 4b of MEA 4 and primary current collector 40 on anode face 6a of MEA 6 while bipolar plate assembly 8 presses up against primary current collector 36 on anode face 4a of MEA 4 and against primary current collector 38 on cathode face 6b of MEA 6. An oxidant gas, such as oxygen or air, is supplied to the cathode side of the fuel cell stack from a storage tank 46 via appropriate supply plumbing 42. Similarly, a fuel, such as hydrogen, is supplied to the anode side of the fuel cell from a storage tank 48 via appropriate supply plumbing 44. In a preferred embodiment, oxygen tank 46 may be eliminated, such that ambient air is supplied to the cathode side from the environment. Likewise, hydrogen tank 48 may be eliminated and hydrogen supplied to the anode side from a reformer that catalytically generates hydrogen from methanol or a liquid hydrocarbon (e.g., gasoline). While not shown, exhaust plumbing for both the $H_2$ and $O_2$/air sides of MEAs 4 and 6 is also provided for removing $H_2$-depleted anode gas from the anode reactant flow field and $O_2$-depleted cathode gas from the cathode reactant flow field. Coolant supply plumbing 50, 52, and 54 is provided for supplying a liquid coolant from an inlet header (not shown) of the fuel cell stack to the coolant flow fields of bipolar plate assembly 8 and end plates 14 and 16. While not shown, coolant exhaust plumbing is provided for delivering the heated coolant discharged from bipolar plate assembly 8 and end plates 14 and 16 to an exhaust header of the fuel cell stack. As is conventional, a fuel cell cooling system is connected between the stack's inlet and exhaust headers which is operable to continuously circulate the liquid coolant and remove waste heat from the stack for rejection to the environment.

The fuel cell shown is fueled by an $H_2$-rich reformate regardless of the method by which such reformate is made. It is to be understood that the principles embodied herein are applicable to fuel cells fueled by $H_2$ obtained from any source, including reformable hydrocarbon and hydrogen-containing fuels, such as methanol, ethanol, gasoline, alkene, or other aliphatic or aromatic hydrocarbons, or from fuel stored on board, such as $H_2$.

Figure 2:
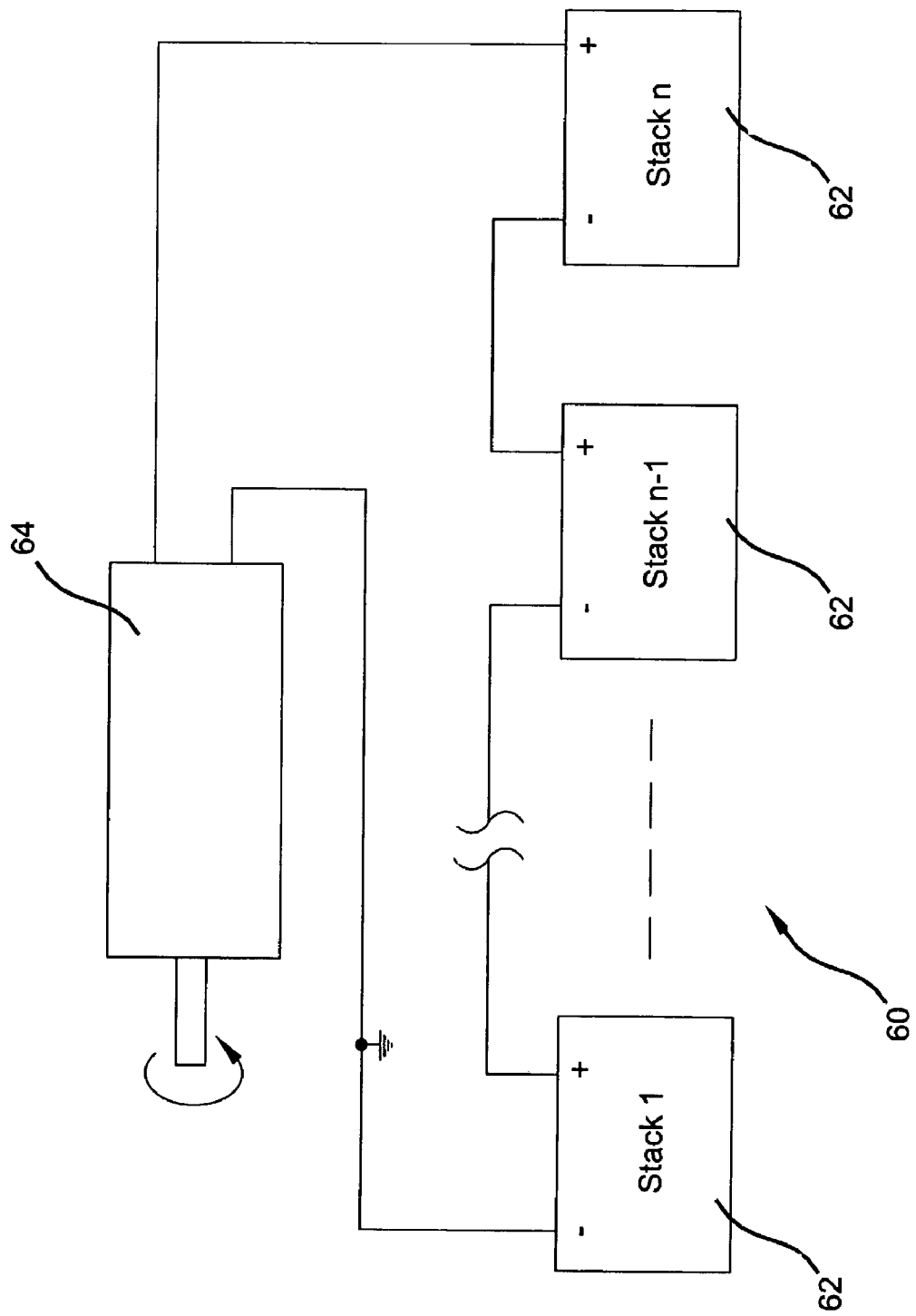
FIG. 2 is a schematic view of a fuel cell system having a plurality of fuel cell stacks interconnected in a typical series circuit.

As mentioned above, the fuel cell stack can comprise any number of individual cells. In a fuel cell stack system, several fuel cell stacks are interconnected for providing power to a power user. In order for the fuel cell stacks to supply power to a power user (e.g. electric motor, lighting systems, control systems, etc.) the individual stacks must be interconnected in a circuit. With particular reference to FIG. 2, a schematic fuel cell stack circuit 60 is depicted including a plurality of individual stacks 62 interconnected in a traditional series circuit for supplying power to a power user 64, in this case an electric motor. As discussed previously, a traditional series circuit retains the specific disadvantage of the complete circuit being rendered inoperative if one stack 62 fails.

Figure 3:
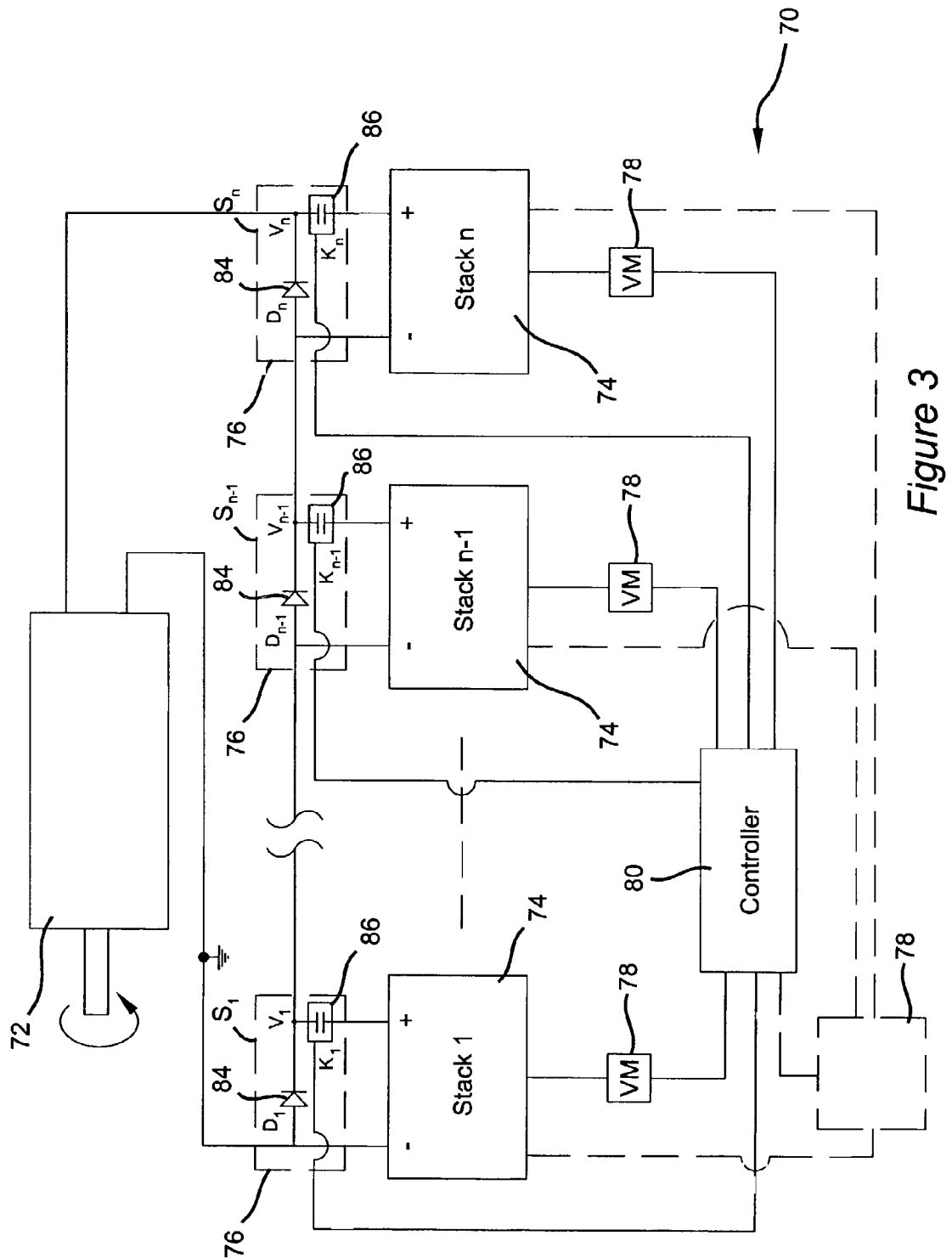
FIG. 3 is a schematic view of a fuel cell system having the plurality of fuel cell stacks interconnected in a series circuit in accordance with the principles of the present invention.

With particular reference to FIG. 3, a fuel cell stack system 70 is schematically shown in accordance with the principles outlined hereinbelow. The fuel cell stack system 70 includes a power user 72 in electrical communication with a plurality of fuel cell stacks 74. The fuel cell stacks 74 are arranged in series fashion and each fuel cell stack 74 includes an associated switching circuit 76 and voltage monitor 78. It is anticipated, however, that a single voltage monitor 78 can be implemented, as shown in phantom, to monitor each of the plurality of fuel cell stacks 74. A controller 80 is further provided and is in electrical communication with each of the voltage monitors 78, or the single voltage monitor 78, as well as the individual switching circuits 76. The controller 80 performs the method of the present invention, as discussed in further detail below, and tracks the operating times of the individual fuel cell stacks 74 (i.e. the amount of time the fuel cell stacks 74 are active in the circuit). The voltage monitor(s) 78 monitor the individual fuel cell stacks 74 for proper operation. In the event of a failure in one of the fuel cell stacks 74, the voltage monitor(s) 78 signal the controller 80, which in turn activates the switching circuit 76 associated with the failing fuel cell stack 74. In this manner, the failing fuel cell stack 74 is removed from the circuit while the remaining fuel cell stacks 74 in the circuit continuously provide power, although at an overall reduced maximum system capacity, to the power user 72.

Each switching circuit 76 generally comprises a diode 84 and a switch 86. The switch 86 may be an electromechanical or solid-state switch, remotely operable by the controller 80. During normal operation, the switch 86 is closed enabling current flow through the associated fuel cell stack 74. With the switch 86 closed, the diode 84 is reverse biased, acting essentially as an open switch, preventing the fuel cell stacks 74 from short-circuiting. In the event that a fault in a fuel cell stack 74 occurs, the voltage monitor 78 reports the fault to the controller 80, identifying the particular fuel cell stack 74. The controller 80 opens the switch 86 associated with the faulty fuel cell stack 74, thereby isolating that fuel cell stack 74 from the circuit. With the switch 86 open, the diode 84 is forward biased, thereby acting as a closed switch, enabling current flow therethrough.

Having bypassed the faulty fuel cell stack 74, the voltage monitor 78 continues to monitor the condition of the particular stack 74. If the fault in the fuel cell stack 74 is eventually cleared, the voltage monitor 78 informs the controller 80, which in turn closes the switch 86. Closure of the switch 86 returns the diode 84 to its reverse biased condition and the total stack current again flows through the fuel cell stack 74.

Figure 4:
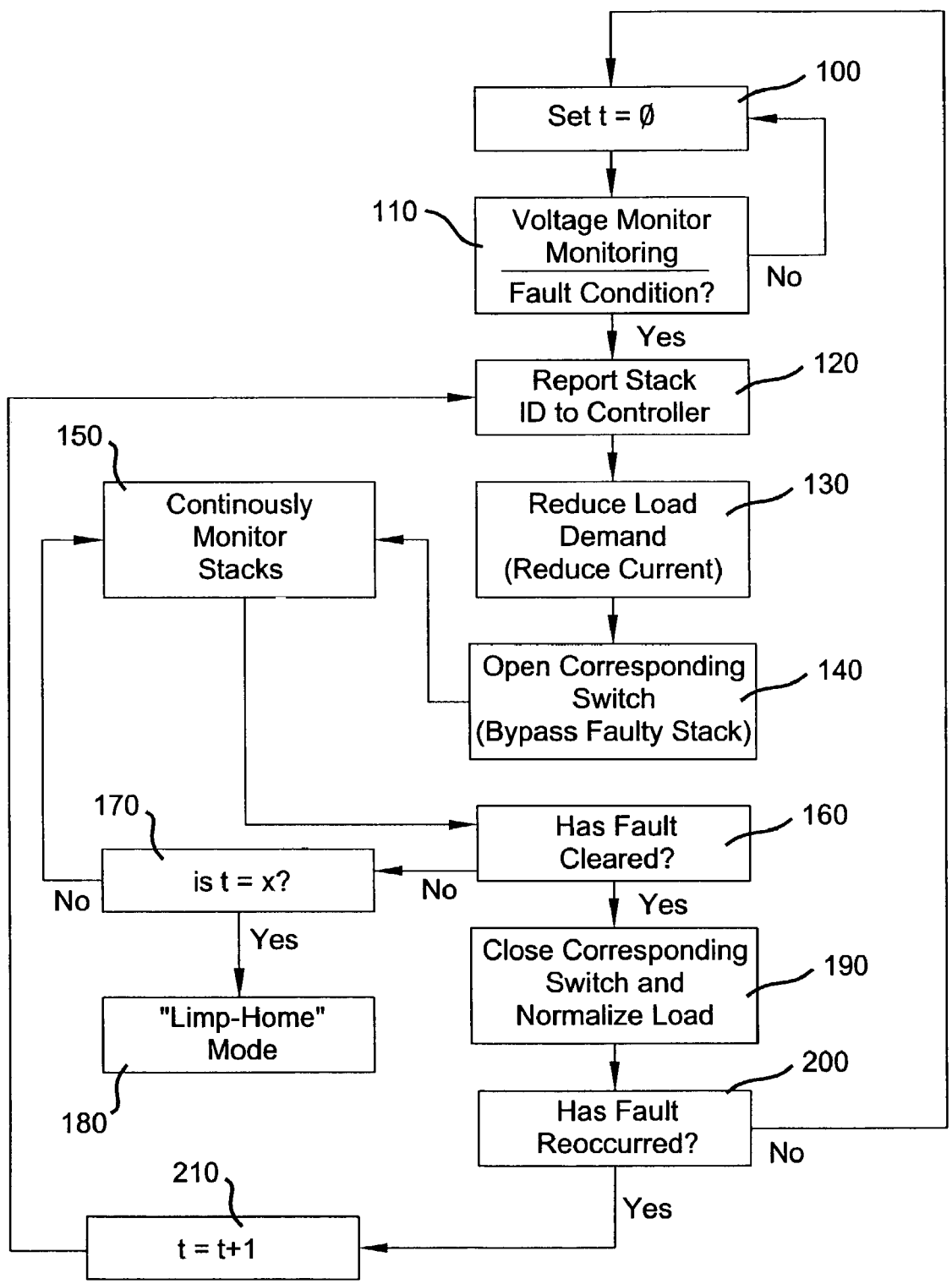
FIG. 4 is a flowchart outlining a method of monitoring performance of the fuel cell system for a fault condition.

The present invention further provides a method for monitoring operation of the fuel cell stack system 70. With reference to FIG. 4, a fault contingency aspect of the method will be discussed in detail. Initially, at step 100, a counter is set to zero. During step 110, the voltage monitor 78 continuously monitors the individual fuel cell stacks 74 for failure. Absent a failure in one of the fuel cell stacks 74, the method continuously loops between steps 100 and 110. However, in event of a failure, the voltage monitor 78 reports the ID of the failed fuel cell stack 74 to the controller 80 at step 120. At steps 130 and 140, the controller 80 switches the corresponding switch 86, thereby bypassing the faulty fuel cell stack 74 from the series circuit.

Having removed the faulty fuel cell stack 74 from the series circuit, the circuit continues to operate, at a reduced maximum capacity, and the voltage monitors 78 continuously monitor the fuel cell stacks 74, including the faulty fuel cell stack 74, at step 150. At step 160, the controller 80 checks with the voltage monitor 78 to see if the fault has cleared. If the fault has not cleared, step 170 checks to see if the counter has achieved a predetermined value X. The predetermined value X represents the number of times the failed fuel cell stack 74 has been reintroduced into the circuit and a fault has reoccurred, as explained in further detail hereinbelow, and may be preprogrammed as any value a particular design requires (e.g. 1, 2, 10, etc.). If the counter has achieved the predetermined value X, then a "reduced capacity" mode is initiated at step 180, whereby the remaining fuel cell stacks 74 power the power user 72 at a reduced capacity until the fuel cell stack system 70 can be serviced. If, however, the counter has not achieved the predetermined value X, the procedure loops back to step 150.

If, at step 160, it is determined that the fault has cleared, the controller 80 closes the switch 86 of the previously faulty fuel cell stack 74 and normalizes the load of the fuel cell stack system 70, at step 190. At step 200, it is determined whether the fault has reoccurred after reconnecting the fuel cell stack 74 with the circuit. If the fault does not reoccur, the procedure loops back to step 100. If the fault does reoccur, the counter is increased by one (1), at step 210, and the procedure loops back to step 120 to bypass the faulty fuel cell stack 74 from the circuit.

Figure 5:
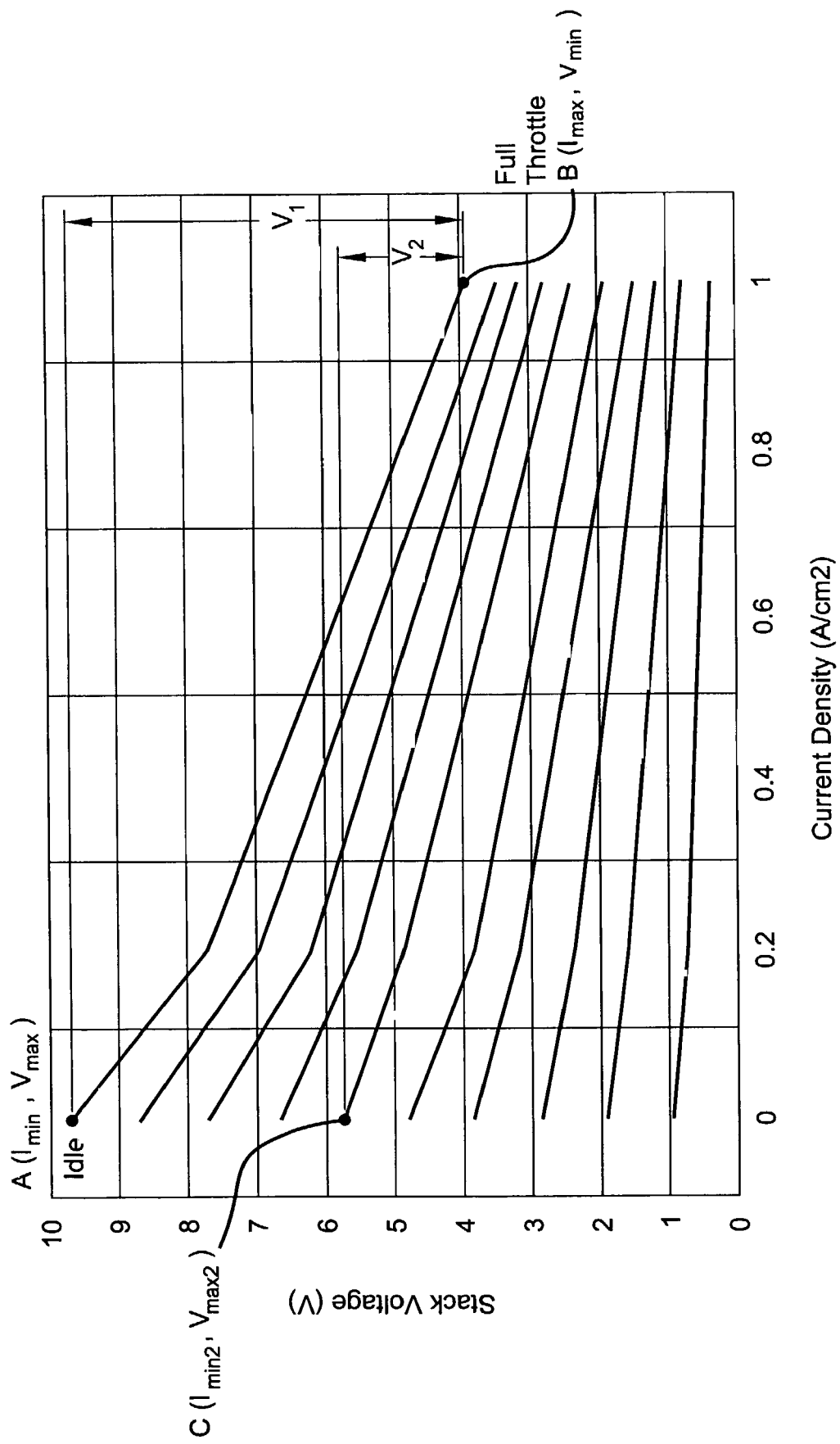
FIG. 5 is a graph displaying fuel cell stack polarization curves.

With particular reference to FIG. 5, typical cell stack voltage polarization curves are graphically shown as stack voltage in volts (V) versus current density (A/cm$^2$). The lowest curve is indicative of a single fuel cell stack 74, and the highest curve is indicative of ten fuel cell stacks 74 connected in series to form a complete fuel cell stack system 70. It will be appreciated, however, that the number of fuel cell stacks 74 making up the complete fuel cell stack system 70 can vary per particular design requirements.

As discussed by way of background, when the power user 72 is operating at full, maximum current is drawn from the fuel cell stack system 70 resulting in a minimum total voltage thereacross. At idle, a minimum current is drawn from the fuel cell stack system 70 resulting in a maximum total voltage thereacross. As shown graphically, the point A ($I_{min}$, $V_{max}$) indicates the idle position, and the point B ($I_{max}$, $V_{min}$) indicates the full throttle position for an exemplary fuel cell stack system 70, having ten fuel cell stacks 74. The voltage range provided by points A and B is indicated as $V_1$, and is defined between $V_{max}$ and $V_{min}$. The auxiliary electrical components, which are powered by the fuel cell stack system 70, would traditionally be required to operate within this range.

An efficiency aspect of the method of the present invention will now be described in detail. In particular, the controller 80 monitors current demand requirements from the fuel cell stack system 70 and selectively removes a single, or multiple fuel cell stacks 74 in order to reduce the total operational voltage across the fuel cell stack system 70, as the power user 72 moves toward idle. Further, fuel cell stacks 74 may be added in order to provide the required current demand, as the power user 72 moves toward full throttle. In this manner, the operational voltage range $V_1$ of the fuel cell stack system 70, discussed above, is reduced, while maintaining its current draw capacity. More particularly, point C ($I_{min2}$,$V_{max2}$) is indicative of an idle position for the fuel cell stack system 70 having four fuel cell stacks 74 removed (i.e. operating with only six stacks). The voltage range provided by points B and C is indicated as $V_2$ and is defined between $V_{max2}$ and $V_{min}$. As seen, the operational voltage range $V_1$ is significantly reduced to $V_2$ via selective removal of the fuel cell stacks 74 as the power user 64 moves towards idle. It will be appreciated, however, that the removal of four fuel cell stacks 74 is merely exemplary, and more or less fuel cell stacks 74 may be removed as design requirements dictate. In this manner, the auxiliary electrical components are only required to operate within the reduced voltage range.

Figure 6:
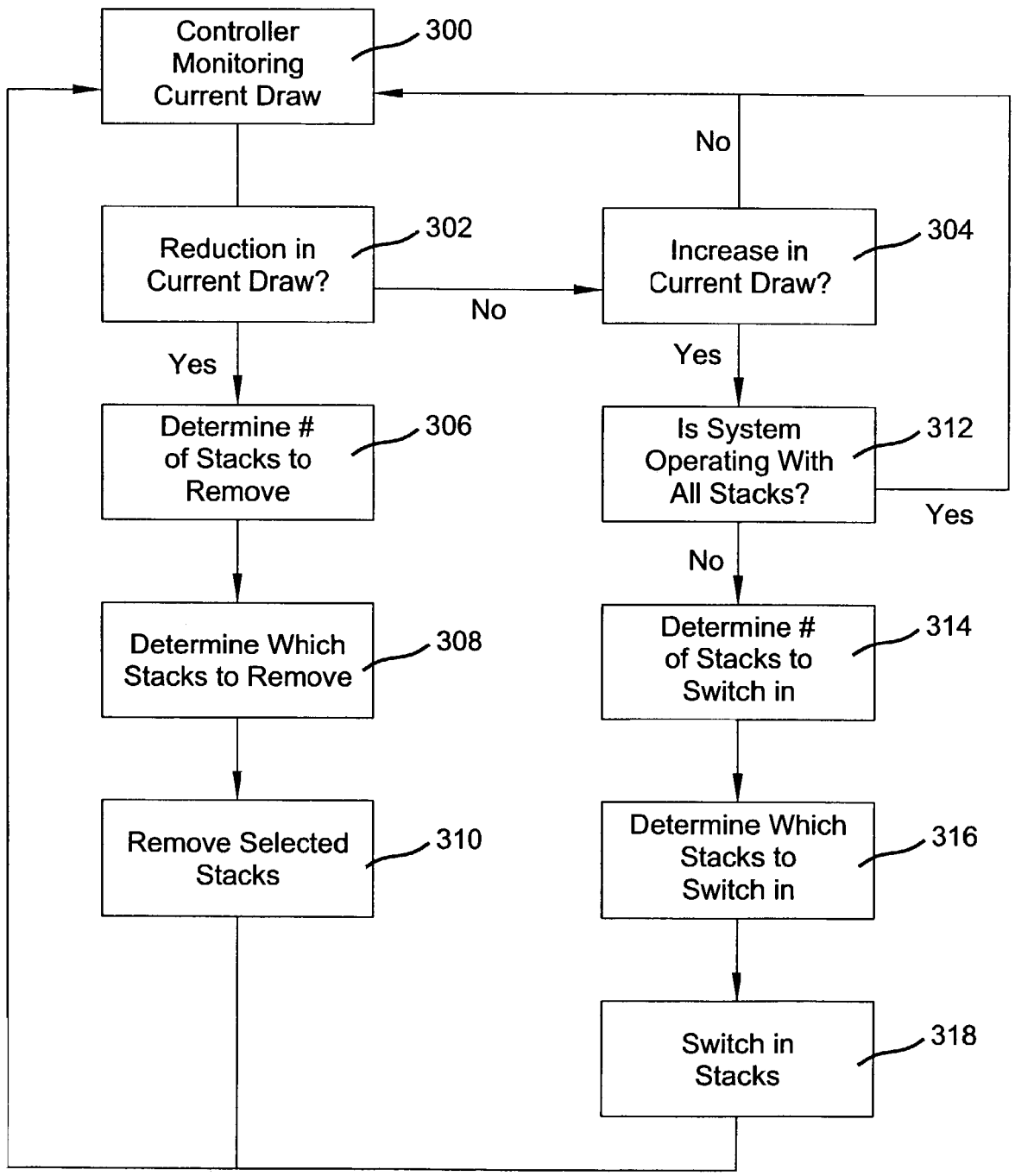
FIG. 6 is a flowchart outlining a method of monitoring current demand from the fuel cell system for improving efficiency thereof.

With particular reference to FIG. 6, the fuel cell stack system 70 monitoring method will be described in detail. Initially, at step 300, the controller 80 monitors the current draw on the fuel cell stack system 70 and determines whether the current draw is being reduced (i.e. moving toward idle), at step 302, or is being increased (i.e. moving toward full throttle), at step 304. If the current draw is being reduced, then the method moves to step 306, where the controller 80 determines the number of fuel cell stacks 74 to remove from the fuel cell stack system 70. Having determined the number of fuel cell stacks 74 to remove, the controller 80 next determines the particular fuel cell stacks 74 to remove, at step 308. The sub-routine defining which fuel cell stacks 74 to remove will be described in detail below, with reference to FIG. 7. At step 310, the controller 80 removes the selected fuel cell stacks 74 from the fuel cell stack system 70 and continues monitoring the current draw at step 300.

If the current draw is being increased, then the method moves to step 312, where the controller 80 determines whether the fuel cell stack system 70 is operating with all fuel cell stacks 74. If so, the controller 80 continues monitoring the current draw, with no further action. If not, the controller 80 moves to step 314, to determine the number of fuel cell stacks 74 to switch back into the fuel cell stack system 70. Having determined the number of fuel cell stacks 74 to switch-in, the controller 80 next determines the particular fuel cell stacks 74 to switch-in, at step 316. The sub-routine defining which fuel cell stacks 74 to switch-in will be described in detail below, with reference to FIG. 8. At step 318, the controller 80 switches-in the selected fuel cell stacks 74 and continues monitoring the current draw from the fuel cell system at step 300.

Figure 7:
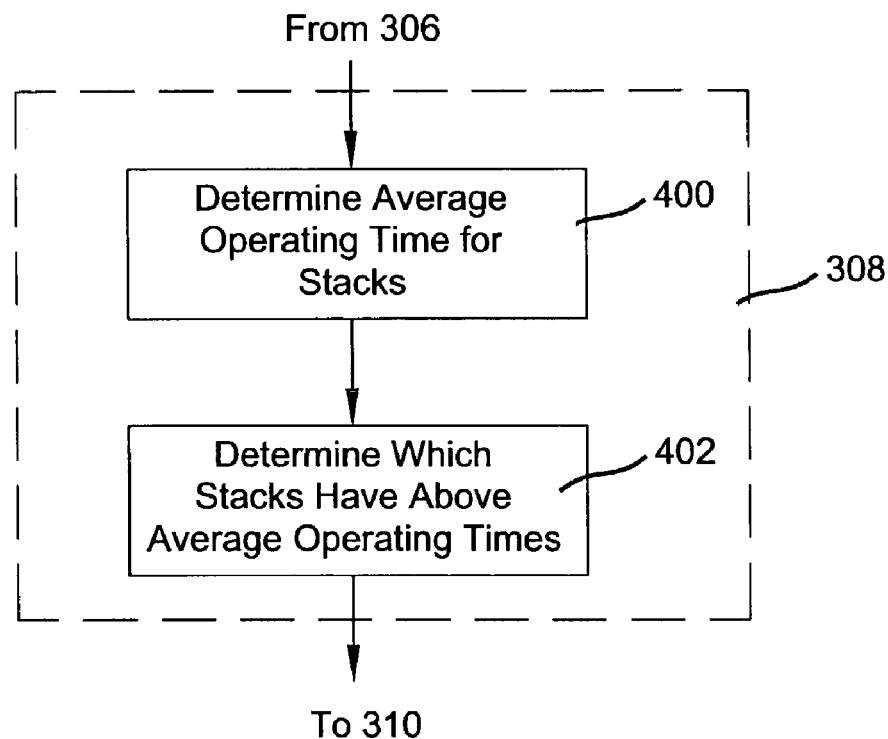
FIG. 7 is a flowchart detailing a fuel cell stack selection algorithm for removing a fuel cell stack, or stacks from the fuel cell system.

FIG. 7 shows an exemplary sub-routine for implementing step 308 to determine which fuel cell stacks 74 to remove. It will be appreciated, however, that the removal sub-routine is merely exemplary in nature and may be substituted by other sub-routines to determine which fuel cell stacks 74 to remove from the fuel cell stack system 70. As discussed previously, the controller 80 monitors the operating time of the individual fuel cell stacks 74. At step 400, the controller 80 determines the average operating time for the fuel cell stacks 74. At step 402, the controller 80 compares the operating time of the individual fuel cell stacks 74 to the average to determine which fuel cell stacks 74 have above average operating times. The fuel cell stack, or stacks 74 with operating times above the average are then removed from the fuel cell stack system 70 at step 310, described above.

Figure 8:
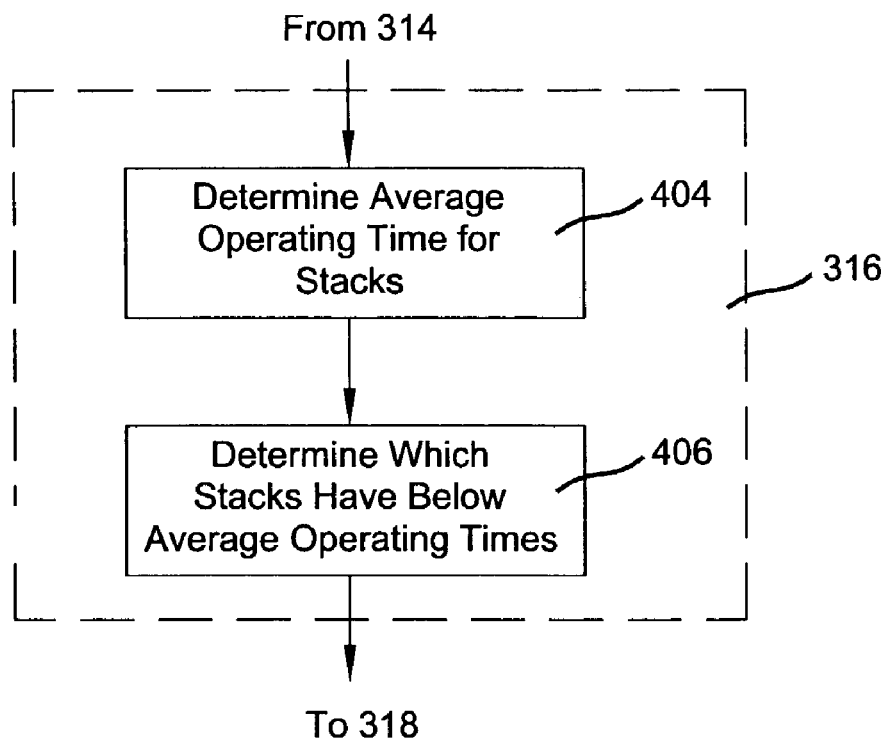
FIG. 8 is a flowchart detailing a fuel cell stack selection algorithm for switching a fuel cell stack, or stacks back into the fuel cell system.

FIG. 8 shows an exemplary sub-routine for implementing step 316 to determine which fuel cell stacks 74 to switch-in. It will be appreciated, however, that the switch-in sub-routine is merely exemplary in nature and may be substituted by other sub-routines to determine which fuel cell stacks 74 to switch-in. At step 404, the controller 80 determines the average operating time for the fuel cell stacks 74. At step 406, the controller 80 compares the operating time of the individual fuel cell stacks 74 to the average to determine which fuel cell stack 74 have below average operating times. The fuel cell stack, or stacks 74 with operating times below the average are then switched into the fuel cell stack system 70 at step 318.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of operating a fuel cell stack system comprising:
   monitoring a plurality of fuel cell stacks for a fault condition and a condition of current demand on said plurality of fuel cell stacks;
   bypassing at least one fuel cell stack of said plurality of fuel cell stacks if said fault condition is detected;
   counting a number of times a particular fuel cell stack recurrently achieves said fault condition; and
   initiating a reduced capacity mode if said number of times is equal to a predetermined value; and
   bypassing at least one fuel cell stack of said plurality of fuel cell stacks if said current demand condition is detected, wherein said current demand condition is one of a reduced current demand condition relative to a prior current demand condition.

2. The method of claim 1, further comprising reconnecting said at least one fuel cell stack if said current demand condition is one of an increased current demand condition relative to a prior current demand condition.

3. The method of claim 2, further comprising:
   determining a number of fuel cell stacks to reconnect, as a function of said increased current demand condition; and
   selecting one or more fuel cell stacks to reconnect.

4. The method of claim 3, wherein selecting said one or more fuel cell stacks comprises determining an average operating time for said plurality of fuel cell stacks, and selecting said one or more fuel cell stacks having an operating time below said average operating time.

5. The method of claim 2, wherein said step of reconnecting said at least one fuel cell stack comprises:
   operating a switch to enable a current flow through said at least one fuel cell stack; and redirecting said current flow back through said at least one fuel cell stack.

6. The method of claim 2, further comprising:
monitoring an external load and adjusting a number of fuel cell stacks powering the external load as the external load varies.

7. The method of claim 1, further comprising:
determining a number of fuel cell stacks to bypass, as a function of said reduced current demand condition; and
selecting one or more fuel cell stacks to bypass.

8. The method of claim 7, wherein selecting said one or more fuel cell stacks comprises determining an average operating time for said plurality of fuel cell stacks, and selecting said one or more fuel cell stacks having an operating time above said average operating time.

9. The method of claim 1, wherein said step of bypassing at least one fuel cell stack of the plurality of fuel cell stacks comprises:
operating a switch to prohibit a current flow through said at least one fuel cell stack; and
redirecting said current flow through remaining fuel cell stacks in the fuel cell stacks system.

10. The method of claim 1, further comprising:
varying the system voltage by adjusting a number of fuel cellstacks powering an external load.

11. A method of operating a fuel cell stack system comprising:
monitoring a plurality of fuel cell stacks for a fault condition;
bypassing at least one fuel cell stack of said plurality of fuel cell stacks if said fault condition is detected;
counting a number of times a particular fuel cell stack recurrently achieves said fault condition; and
initiating a reduced capacity mode if said number of times is equal to a predetermined value.

12. The method of claim 11 further comprising:
reconnecting said at least one fuel cell stack if said fault condition clears;
bypassing at least one fuel cell stack of said plurality of fuel cell stacks if a reduced current demand condition relative to a prior current demand condition is detected; and reconnecting said at least one fuel cell stack if an increased current demand condition relative to a prior current demand condition is detected.

13. The method of claim 12, further comprising:
determining a number of fuel cell stacks to bypass, as a function of said reduced current demand condition; and
selecting one or more fuel cell stacks to bypass.

14. The method of claim 13, wherein selecting said one or more fuel cell stack comprises determining an average operating time for said plurality of fuel cell stacks, and selecting said one or more fuel cell stacks having an operating time above said average operating time.

15. The method of claim 12, further comprising:
determining a number of fuel cell stacks to reconnect, as a function of said increased current demand condition; and
selecting one or more fuel cell stacks to reconnect.

16. The method of claim 15, wherein selecting said one or more fuel cell stacks comprises determining an average operating time for said plurality of fuel cell stacks, and selecting said one or more fuel cell stacks having an operating time below said average operating time.

17. The method of claim 12, wherein said reconnecting said at least one fuel cell stack comprises:
operating a switch to enable a current flow through said at least one fuel cell stack; and
redirecting said current flow back through said at least one fuel cell stack.

18. The method of claim 11, wherein bypassing at least one fuel cell stack of the plurality of fuel cell stacks comprises:
operating a switch to prohibit a current flow through said at least one fuel cell stack; and
redirecting said current flow through remaining fuel cell stacks in the fuel cell stacks system.

* * * * *